United States Patent [19]

Tesch

[11] Patent Number: 4,622,260
[45] Date of Patent: Nov. 11, 1986

[54] MAT SHAPED COMPOSITE BODY

[76] Inventor: Guenter H. Tesch, 22, Rte de la Heitera, Fribourg, Switzerland, CH 1700

[21] Appl. No.: 402,087

[22] Filed: Jul. 26, 1982

[30] Foreign Application Priority Data

Jul. 27, 1981 [DE] Fed. Rep. of Germany ....... 3129509

[51] Int. Cl.[4] ................................................ B32B 3/00
[52] U.S. Cl. ..................................... 428/173; 428/70; 428/72; 428/156; 428/166; 428/172; 428/281; 428/283; 428/284; 428/300; 428/323; 428/331
[58] Field of Search ............... 428/70, 241, 219, 323, 428/331, 300, 283, 340, 404, 72, 281, 156, 166, 281, 173, 172

[56] References Cited

U.S. PATENT DOCUMENTS

| | | | |
|---|---|---|---|
| 3,752,721 | 8/1973 | Clark et al. | 156/148 |
| 4,250,172 | 2/1981 | Mutzenberg et al. | 428/234 |
| 4,296,166 | 10/1981 | Ogino | 428/283 |
| 4,357,386 | 11/1982 | Luciano et al. | 428/283 |
| 4,424,248 | 1/1984 | Tesch et al. | 428/172 |

Primary Examiner—James J. Bell
Attorney, Agent, or Firm—Bacon & Thomas

[57] ABSTRACT

A mat like composite body (1) comprising a cover layer (2) of a fiber or filament fleece and a backing layer (3) comprising the same fleece or of a synthetic plastic sheet (7), in particular one provided with depressions (8), between the cover layer (2) and the backing layer (3) a layer (5) of particles (6) of an inert material, preferably rock particles, is arranged. The three layers (2, 3 5) are needle-bonded together prefereably with holding fibers (4) taken from the cover layer (2) is described. Different possible applications of the composite body (1) are disclosed, whereby the composite body (1) by the utilization of the properties of the granular particles (6), which serve for example to dilute and/or carry other particles (13), such as binders, active ingredients, etc, is applied to the external treatment of human or animal bodies, sound attenuation, fire protection, the weighting of third bodies or as a so-called car protection mat. Furthermore, advantageous measures are disclosed for the needle-bonding of for example rock particles.

17 Claims, 6 Drawing Figures

MAT SHAPED COMPOSITE BODY

This invention concerns a mat shaped composite body comprising a cover layer of a fiber or filament fleece, a backing layer and a layer of particles arranged between these layers, wherein the particles are held by individual holding fibers or bundles of such fibers, the holding fibers being inserted by needles in a distribution over the surface of the composite body through the particle layer and joining the cover layer and the backing layer with each other.

Such a body is known for example from No. DE-OS 28 55 059. This known composite body contains between a cover layer and a backing layer, a layer of particles of active ingredients, with at least the cover layer being actively needle bonded through the layer of particles with the backing layer. The particles of the active ingredient provided in the composite body are capable of releasing to water flowing by or through it. The active ingredients may be for example, fertilizers or protective agents for plants, but also comminuted natural substances such as leather, peat tree barks, or the like, may be involved.

These known composite bodies may be used as a filter, but when they contain peat, for example, they are suitable for the absorption of oil spills.

A composite body of this type may contain ion exchangers as the particulate active ingredient, whereby it is possible e.g. to eliminate the carbonate hardness of water or to release fertilizer salts.

Particularly in use in hydrocultures, various disadvantages of these known composite bodies have become apparent in actual practice.

Because of the material used—retained between the cover layer and the backing layer of the composite body, this known composite body is very light. Consequently, in hydrocultures it does not settle on the bottom, but rises to the surface thereby contacting the parts of plants in the water, which is undesirable. Furthermore, it is especially difficult to uniformly distribute small amounts of particles of active ingredients or the like in such a composite body, which results in problems when a composite body produced in large sheets is to be portioned into individual segments.

Potential applications of the known composite bodies are restricted by the active ingredient particles contained therein to a few areas corresponding to the nature of the active ingredients, in particular due to the fact that the particles contained in the body are in part highly reactive even when in contact with the atmosphere, but also markedly change their behavior when other media, especially liquids, are passing through the composite.

It is therefore the object of this invention to provide a composite body of the aforementioned general type whereby the above cited disadvantages are eliminated and the potential applications of the body expanded. This object is attained by the use of inert particles as the particulate material. The particles provided in accordance with the present invention comprising inert material are particularly suitable for use as a carrier and/or diluent e.g. for the aforementioned particles of an active ingredient. When particles are further provided which contain inorganic silicate compounds or consist of such particles, such as particles of rocks in the form of sand, gravel or the like, the composite body will have a specific gravity so that it will no longer rise to the surface in a liquid.

The particles employed according to the invention should be sufficiently hard so that they will not be destroyed during needle bonding; this is specifically true for sand and gravel. While in the known composite bodies the average grain diameter of the particles is smaller after needle bonding than prior to it and in particular the range of diameters have been enlarged by the division of a few particles, the composite body of the present invention contains exactly the grain sizes introduced into it.

The granular particles used according to the present invention, especially rock particles by their very nature have properties preventing needle bonding, especially as they cannot be penetrated or destroyed by the needles. However, it has been surprisingly discovered that the cover layer and the backing layer may be needle bonded by conventional needle bonding methods, for example by means of needle bonding needles with barbs, such as e.g. felting or triangular quilting needles, without appreciable damage, wear or destruction of said needles, through the layer of granular particles. This is presumably due to the fact that the granular particles are preferably present in a displaceable manner with respect to each other and that particles impacted by the needles are able to move laterally so that the bonded composite according to the invention may be obtained with an internal layer of hard, granular particles. It has also been surprising that the granular particles in the finished product cannot flow between the fibers of the actively needle bondable fiber layer, since the bonding process densified the fiber layer to the extent that the loss of the particles is no longer possible.

Even though particles of different sizes may be bonded depending on the application, in a particular embodiment, the particles have a grain size of from 0.02 to 3 mm. Correspondingly, the weight per unit area of the particles may be between 0.5 to 12 kg/m$^2$, depending on the application.

By the use of rock particles in particular, the composite body acquires a specific gravity so that for example, in water it no longer rises to the surface, but settles on the bottom of a vessel or a lake, or the like.

In addition to the inert particles, especially rock particles, other particles of a different type may further be provided, which are diluted by the particles of the first type. If for example, both particle groups are present in the same grain size, they may be intimately intermixed prior to their placing on the backing layer so that they are present in a uniform distribution in the composite body where they cannot separate. If, on the other hand, the grain size of the additional particles is substantailly smaller than the grain size of the rock particles or the like, the additional particles may be attached to the rock particles, for example by adhesive bonding. The additional particles may consist of for example, the particles of active ingredients used in the known composite bodies, such as particles absorbing or releasing substances. If the additional particles used consist of substances reacting in liquids, such as those representing a binder, the composite bodies according to the invention may be rigidized. However, e.g. synthetic resins suitable for rigidizing may also be employed.

The individual fiber or filament fleece should have a weight per unit area of 50–400 g/cm$^2$, with a prebonding of the fleece being preferred. In particular, when especially small particles are used, it is advisable to prebond by needle felting, the fleece with preferably a sheet of a synthetic plastic.

Preferably, the length of the fibers of the fleece is approximately 40-150 mm, with this length depending on how thick the composite is to be in its final state, as at least part of these fibers or filaments are used as holding fibers or filaments from the cover layer in the active needle bonding with the backing layer.

The backing layer may consist of the same fleece, possibly arranged symmetrically to the particle layer. But the backing layer may also consist of a material free of fibers or filaments, which, however, must be capable at least of passive needle bonding. In addition to a width of fabric, a sheeting, especially of a preferably tough synthetic plastic is suitable. A sheet of this type may be provided with preformed, e.g. elongated or bowl like depressions, wherein the particles are arranged. Adjacent depressions may be filled, when desired, with particles of a different nature.

Even when the backing layer consists of a fleece similar to that of the cover layer, it is still possible to arrange the rock particles in patterns, e.g. in strips while leaving strips in between, free of rock particles. The other particles may be placed in patterns over the rock particles arranged in this manner or in between, supplementing them.

Such a composite body according to the invention may be employed in different areas, as a function of the particles bonded into them.

A composite body filled with rock particles is thereby given a relatively high specific gravity, as mentioned hereinabove. The composite body thus is capable of weighing down an object upon which it is placed, or its weight may be used to keep other particles, introduced into it, e.g. on the bottom of a vessel filled with a liquid. These may consist e.g. of thin substances, which furthermore are present in a uniform, diluted distribution effected by the rock particles, whereby the composite bodies are especially suitable for hydrocultures.

By virtue of its weight and flexibility, the composite body, especially in a sheet form, may be placed on slushy roads, such as forest or field roads, thereby rendering them immediately passable. If in this case other particles are added to the rock particles, consisting of binders, such as cement or the like, the composite will absorb the liquid from the slush and harden upon drying. Because of the specific configuration of this composite body, in which at least the cover layer consists of a fiber or filament fleece and the granular particles are held by the holding fibers, this road covering will not be destroyed when the part consisting of rock particles and cement is broken up by the weight of a vehicle passing over it. For the same reason, such road coverings are capable of operating even during wide variations in temperature, withough being destroyed or cracking.

Based on its weight and the fact that it may be cut without losing an appreciable number of particles, a composite body according to the invention may be used to secure against water breaks. In this application e.g. a sheet of the composite body is transported in rolls to a break or an endangered location of a dam, laid down and simply unrolled. Depending on the size of the location to be secured, the length of the sheet to be placed is determined and possibly the sheet cut into sections on the site itself. Obviously, as a function of the thickness of the cover required or of the depth of the break, any number of sheets may be rolled or placed upon each other.

Particles of inorganic silicate compounds, especiallly rock particles such as sand, have high heat capacities, whereby they may be used advantageously in external treatments of human or animal bodies. If only this thermal effect is to be utilized, composites containing only sand particles, are adequate. A composite body of this type, heated e.g. in an oven, may be placed on the body surfaces to be treated to provide heat. By virtue of its weight and a certain degree of elascticity, even a flat composite will adjust itself to the human or animal body. A composite according to the invention may, however, contain other particles also, such as fango or mud packings, cosmetics or the like, and may be used advantageously as a face mask for facial treatments. In contrast to known face masks, this mask according to the invention, may be lifted from the face after treatment, together with its packing content, and reused.

As the granular particles, such as for example, sand, are held in the composite by the holding fibers, but are moving freely with respect to each other, the composite body according to the invention, especially in the form of a mat, is particularly suitable for sound attenuation. Such a mat may be suspended from a tubular frame and e.g. arranged adjacent to heavily travelled roads or in factories next to noisy machines.

Because of the poor thermal conductivity of rock particles, such as sand, composite bodies according to the invention may also be used for thermal insulation and fire protection. Flame inhibiting or extinguishing substances may be used as the other particles. A composite of this type may be fashioned into a fire blanket or protective clothing.

If the composite of the invention, filled with sand, is used for example as a so-called car mat, due to the properties of this composite, different applications are conceivable. Because of its stability, the composite may be placed as a mat under the tires of a car, when these tires have lost their grip on the ground, due for example to ice or slush. Such a composite may further be employed as an easily handled additional weight, to be placed simply over the axle of the driven wheels, i.e. in most case simply placed in the trunk. Further, more, the protective mat may be used in winter as an adaptable covering on a parked car on the front and rear windows when there is the danger of freezing. It is further possible for the manufacturer to place such protective mats for acoustic insulation in various locations, particularly in the engine compartment of automobiles.

It is seen from the foregoing that the composite body of the invention has numerous potential uses; thus it may further be used, especially if the cover layer has an optically pleasing appearance, as a floor or wall covering and as the result of its rock particle, etc. content, mixed with hydraulic binders as the other particle. There are may applications in the construction industry for such a composite.

A process for the preparation of the composite bodies according to the invention will be described. In the process, granular particles are placed on a backing layer, a cover layer of an actively needle bondable fiber or filament fleece is placed on said particle layer and then, at locations distributed over the entire surface of the composite, a plurality of holding fibers are inserted individually or in bundles, at least from the cover layer, by means of fiber orienting needles, through the particle layer into the backing layer retaining the particles, so that the cover layer and the backing layer are joined with each other. Particularly during the needle bonding of the rock particles, the vibrations of the needle machine are preferably not damped, but are utilized positively in the needle bonding process. It is advisable further to make the distance between needles on the needle board larger than usual and to set the advance per needle stroke smaller than customary.

Especially if a stronger composite body, with high bending rigidity is to be produced, the backing layer and/or the cover layer may contain fibers capable of shrinking. The fibers are then exposed to a shrinking treatment after needle bonding.

Further details and advantages of the invention will become apparent from the claims and the examples of embodiment described hereinafter with the aid of the drawing. In the drawing, partial segments of composite bodies of the invention are represented schematically and enlarged. In the drawing:

Figure 1:
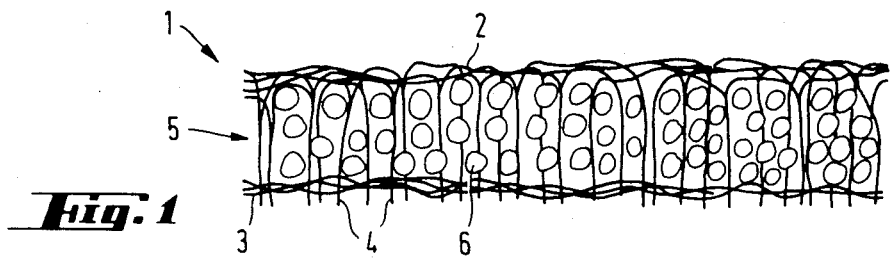
FIG. 1, shows a first embodiment of a composite body in a cross section, wherein both the backing layer and the cover layer consist of a fiber fleece wherein the particles are uniformly distributed.

Considering the drawing in more detail it is noted that the composite body 1 has a cover layer 2, which is capable of active needle bonding and consists of a fiber fleece. A backing layer 3, which is at least passively bondable, is held by the holding fibers 4 against the cover layer 2, the holding fibers being taken from the cover layer 2. A layer 5 of dicrete particles 6 is arranged between the cover layer 2 and the backing layer 3. The layers 2 and 3 are joined by needle bonding through the particle layer 5. The needle bonding may be effected by means of a needle felting process known in needle felting technology, as described for example by R. Krecma in "Handbook of Textile Composites", Deutscher Fachverlag Press, Frankfurt/Main, 1979, pp. 198-202. In this method, most frequently felting needles with triangular shafts and lateral barbs directed toward the point, are used. Other forms, such as forked needles and loop needles are also employed. The stitch bonding needles mentioned in the aforecited book may also be used for the bonding of the composite body. The felting needles grip during their insertion into the fiber layer 2 individual fibers or fiber bundles 4 from the fiber layer and twist-bind them with the backing layer 3. The fiber layer 2 must be actively needle bondable, i.e. it must be possible to grip fibers of this layer, with part of the fiber remaining anchored in the layer 2.

By means of the needle process not only the cover layer 2 and the backing layer 3 are joined with each other, but the granular particles 6 of layer 5 are prevented from lateral shifting by the holding fibers 4 inserted in a uniform distribution over the entire surface of the composite 1. It is therefore feasible to cut the composite body into arbitrary shapes without losing an appreciable amount of the particles from the cut edge.

The composite body 1 produced in sheet form may further be divided into the desired sizes by weld cutting. If thermoplastic fibers are used, the edges of the individual pieces may be reinforced by welding. Optionally, in the area of the edge a strip of a thermoplastic material, not shown, may be welded on under the effect of heat and pressure, whereby the composite 1 acquires a more pleasing appearance. The layer 5 of granular particles 6 consists of rock particles of a small grain size for example of sand, which by definition has a grain size of 0.02-2 mm. But coarse sand, gravel and even chips may be used to the extent that they do not interfer with the insertion of the needles. The advantageous common properties of these materials are their relatively high heat capacity, their relatively great weight in relation to a given layer thickness and particularly their inert behavior towards other substances.

As shown in the drawing, the backing layer 3 may consist of different materials. It should not splinter upon the insertion of the needles and it must hold the holding fibers 4 inserted elastically, e.g. by clamping or twisting, i.e. the backing layer 3 must be at least passively capable of needle bonding.

Figure 4:
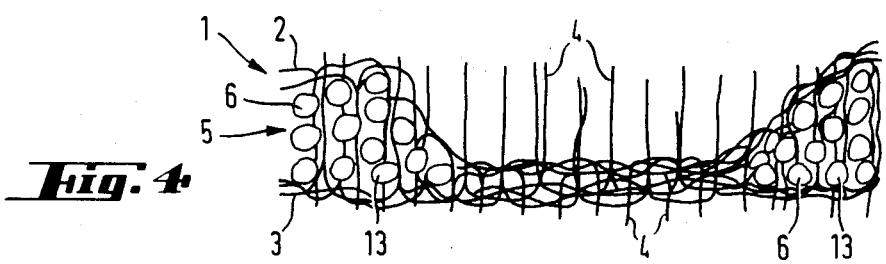
FIG. 4, shows a fourth embodiment of the composite body in a cross section, wherein the composite body according to FIG. 3 is needle bonded from two sides.

Synthetic plastic sheets of a soft, elastic material (e.g. FIG. 2), layers of fibers of the thickness desired, which in themselves are further densified and felted by the needle bonding process, so that they retain the particles 6, together with adhesively bonded fiber composites, fleece or spunbonds, are also suitable. The backing layer 3 may itself be actively needle bondable, whereby the composite 2, as shown in FIG. 4, may be additionally bonded from the reverse side. It is further possible to provide under the synthetic plastic sheet or the like as the backing layer 3, another actively needle bondable fiber layer on the outside of the composite and then to bond the composite body 1 from both sides.

The fiber layer, both as the cover layer 2 or the backing layer 3, may be predensified by separate needle bonding. It may also be bonded to a carrier, such as e.g. a synthetic plastic sheet, a fibrous composite, or the like, in order to facilitate handling in the manufacturing process and/or to prevent the running of fine particles 6, and especially particles 13, prior to the needle bonding of the composite 1.

Figure 2:
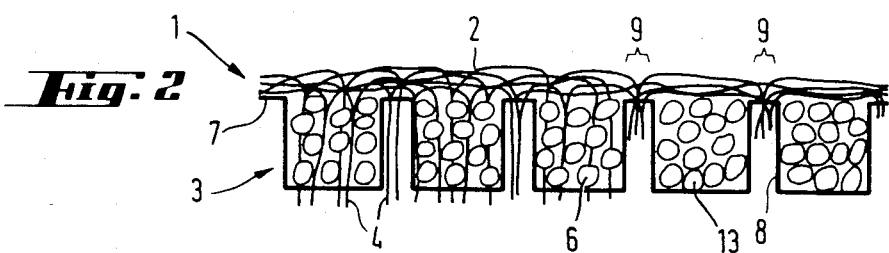
FIG. 2, shows a second embodiment of the composite body in cross section, wherein the backing layer is provided with bowl like depressions in which the particles are located.

Different textile fibers may be considered for the fiber fleece. They may be either organic or inorganic fibers. Polypropylene or polyester fibers, which may be thermoplastically deformed, welded or cut, are especially suitable. In special applications, absorbent fibers, such as wool, cotton, cellulose or viscose may be used. These fibers may be specifically treated to suit the application. On the other hand, water swelling or water soluble fibers, such as polyvinylalcohol fibers or the like, may be employed, in order to prepare wet-formable composite bodies. A synthetic plastic sheet 7 of a fibrous composite as shown in FIG. 2, may be used as the backing layer 3; which sheet may be provided with depressions 8, which are obtained e.g. by deep-drawing in the thermoplastic state. The depressions 8 are as shown in FIG. 2 in the shape of bowls. However, they may also have an elongated configuration wherein they are parallel to each other and can be arranged, for example, offset in their positions with respect to each other. The depressions 8 are opening toward the cover layer 2, so that the particles may be inserted in the depressions. In the embodiment according to FIG. 2, the layer 5 of the particles 6 is not coherent, but divided into numerous portions. The needle insertions may be divided with a uniform density over the entire surface of the composite body 1, as shown with the three left bowls of FIG. 2, with the holding fibers 4 penetrating through the bottoms of the bowls. When the holding fibers 4 are inserted less deeply, as in a form of embodiment not shown, they are terminating in the bowls itself, while they are penetrating through the portion 9 of the sheet 7 which do not contain depression bowls, whereby the cover layer 2 is joined with the backing layer consisting of the plastic sheet 7. The needle bonding of the composite body may be effected so that the points of the needles perforate the bottom of the depressions 8, so that fluids may filter from the side of the backing layer 3 into the depressions 8. According to the representation in the right side of FIG. 2, the cover layer 2 is joined with the synthetic plastic sheet 7 only in the area of the depression-free area 9 by means of holding fibers 4. However, the preparation of this form of embodiment requires special care.

Figure 3:
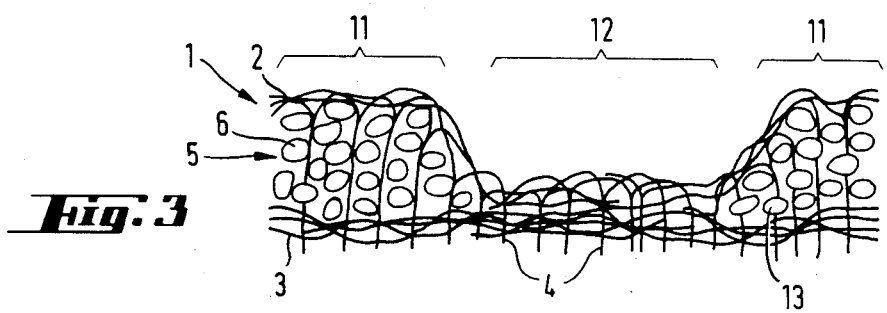
FIG. 3, shows a third embodiment of the composite in a cross section, wherein the particles are arranged in strips in the composite body.

In the embodiment of the composite body 1 shown in FIG. 3 and 4, rows or strips of the granular particles 6 are placed on an actively bondable fiber layer 3. They form an interrupted intermediate layer through which the needles pass. A further needle bondable layer 2 is placed on these rows 11 of particles 6 and the composite needle-bonded from the top.

The form of embodiment according to FIG. 4 corresponds essentially to the form according to FIG. 3, but the composite is also needle bonded from the bottom side, i.e. the holding fibers are taken both from the cover layer 2 and the backing layer 4.

It is common to the embodiments of FIG. 3 and 4 that they form at the locations 12 which are free of particles, a type of hinge, which is particularly effective when the strips or rows 11 of the particles are rock particles 6 which are present together with other particles 13 as the binder, in the bonded form.

Each of the embodiments according to FIG. 3 or 4 or similar embodiments, not shown, may contain in adjacent strips alternatingly particles 6, such as sand or the like, and other particles 13.

Figure 5:
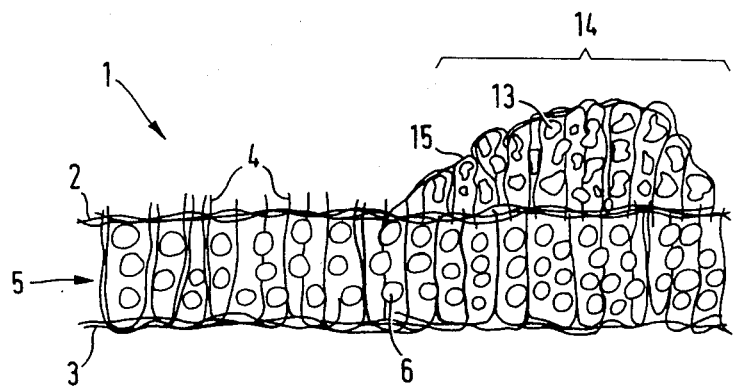
FIG. 5, shows a fifth form of embodiment, wherein a layer with different particles with a second cover layer is needle bonded onto a composite body filled with granular particles.
Figure 6:
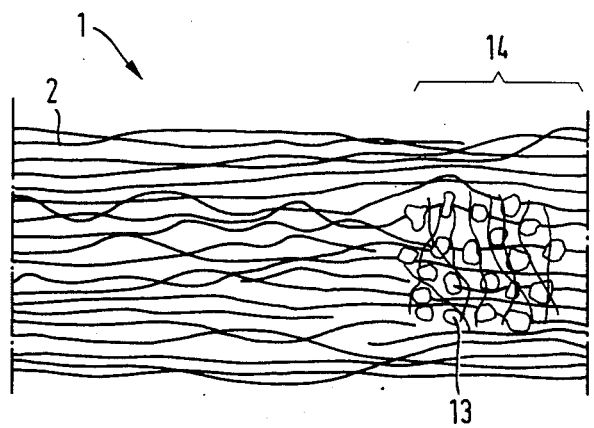
FIG. 6 shows a top view of the embodiment of FIG. 5.

In FIG. 5 and 6 a composite body 1 is shown which has a configuration similar to that of FIG. 1. However, the composite body 1 is bonded in the position indicated from the bottom. On the cover layer 2, needle bonded passively only, is placed a further layer 14 of other particles 13, such as active ingredients of carrier particles releasing and/or absorbing substances. The further layer 14 is needle bonded by means of a further, possibly prebonded fiber layer 15 to the composite body. As seen in the top view of FIG. 6, the range of the layer 14 is limited in its adaptation to a special application, with respect to its surface area. According to a further embodiment, not shown, a further particle layer, such as 14, may be bonded adjacent to each other or over each other. The rock particles 6 then are serving, if in the layer 5 other particles 13 are also provided, as a diluent of the latter. These other particles 13 may have the same grain size as the rock particles 6, but they may be of a substantially smaller grain size, particularly when consisting of a binder, such as cement, lime or the like, as indicated e.g. in FIG. 2.

By using gypsum as the binder, bandages to treat bone fractures may be prepared. The composite body 1 is saturated with water immediately preceding application, shaped to the body member and the latter immobilized until the gypsum has set. Packages with unilateral flexibility may also be formed from composite bodies by means of the addition of binders. The embodiment according to FIG. 3 and 4 is given as an example. The abovedescribed anisotropy of the flexibility of the composite 1 demonstrated therein, may be reinforced by the addition and activation of a binder to the rock particles 6, whereby the rows 11 are rigidized, while the interstices remain flexible. By deep-drawing or wet deformation after needle bonding, such a composite body 1 may be used as a face mask, for example for cosmetic applications. Herein, loose needle bonding may be of advantage. The composite bodies 1 may be rigidized by means of the binders 13, added to the rock particles 6 and activated after shaping. The eye and nose portions are opened by the simple cutting or punching of orifices. It is a substantial advantage of the composite according to the invention, that the particles are prevented from running out by the inserted holding fibers 4. The form of embodiment according to Fib. 5 and 6 is especially suitable for this purpose, wherein the further layer 14 contains the active ingredient particles 13 required for the facial treatment.

When thermoplastic fibers are used, the cutouts may also be effected for example by means of a hot punching iron, whereby the fibers at the cut edges are simultaneously welded together, so that the edges cannot fray out.

The use of sand as the particles 6, especially of washed quartz sand, together with sterilizable fiber material, such as cotton, polypropylene, offers the advantage that the composite bodies may be prepared in a hygienically satisfactory manner and that they remain completely inert in relation to third substances, such as fluids for the treatment of the body. It is then possible to massage through the composite body used e.g. for body treatments, without the composite losing its coherence, as is the case with the conventional fango packs or the like.

The table hereinbelow, describes grain size diameters of the particles 6, and give preferred grain size ranges for particle weight by unit area, fiber thickness, fleece weight per fiber layer, needle thickness and stitch density.

TABLE

| Grain Diameter (mm) | Particle Weight per unit area (kg/cm$^2$) | Fiber (dtex) | Fleece Weight per layer, per unit area (g/m$^2$) | Needle thickness (gg) | Stitch density (stitch/cm$^2$) |
| --- | --- | --- | --- | --- | --- |
| 0.02–0.1 | 0.5–1 | <10 | 150 | 36 | 200–100 |
| 0.1–1.0 | 1–5 | 5–20 | 150 | 30 | 120–60 |
| 1–3 | 1–10 | 10–30 | 250 | 25 | 60–20 |
| 3–(30) | 5–12(20) | >20 | 350 | 17 | 30–5 |

When a synthetic plastic sheet 7 is used as the backing layer 3, as in FIG. 2, the sheet thickness is between 30 and 200 μm, with a thicker sheet being used for larger grain diameters.

An example for the preparation of a composite body 1, according to FIG. 1 is as follows.

The cover layer 2 and the backing layer 3 are made identically of the same material in the following manner. A fiber mixture of 200 g/m$^2$ of polyester fibers with a fiber titer of 3.3 and 17 dtex and a staple length of 90 mm, is placed onto a support sheet of 0.1 mm thick polyethylene. The fibers were preboneded with the sheet by means of conventional felting needles with 45 stitches per cm². A prebonded fiber layer was placed onto the feeder table of the needle machine with the fiber beards directed upwards and a layer of washed quartz sand with a grain size of 0.5–0.75 mm sprinkled on in an amount of 7 kg/m². The layer was then covered by an identically prebonded fiber layer, with the fiber beards directed downward. The entire composite body was then bonded with conventional 25 gauge felting needles and with 30 stitches per cm². A composite body of approximately 7.4 kg per m² was obtained.

An example for the preparation of a composite body 1 according to FIG. 2 is as follows:

A nubbed sheet 7 of polyethylene with cylindrical depressions (nubs) of a 1 cm diameter and a depth of 5 mm, 7'700 nubs per m², was used as the backing sheet 3. The nubs were filled level with quartz sand and covered with a layer of polypropylene fibers, 17 dtex, staple length 90 mm, 200 g/m². The composite body was needle bonded with conventional 25 gauge felting needles, with 30 stitches per cm². A composite body 1 of a unit area weight of approximately 1.8 kg per m² was obtained. The nubs were perforated by the needles. However, the sand was prevented from dropping out.

What is claimed is:

1. A mat shaped composite body comprising an actively needle-bondable predensified cover layer of a fiber or filament fleece, a backing layer which is at least passively needle-bondable and comprises a tough sheet of synthetic plastic having depressions, and a discrete layer of particles comprising an inert material arranged between said layers, the particles have a hardness adequate to preserve them from destruction by needle bonding, and wherein the particles are held and secured against shifting in the direction of the plane of the cover layer by individual holding fibers or bundles of such holding fibers, and said holding fibers being inserted by needles in a distribution over the surface of the composite body through the particle layer and joining the cover layer and the backing layer with each other.

2. A composite body according to claim 1 wherein the depressions have a configuration of bowls.

3. A composite body according to claim 1, wherein the depressions are elongated.

4. A composite body according to one of claims 1–3, wherein the particles are arranged specifically only in the depressions.

5. A composite body according to claim 3, wherein the adjacent depressions are filled with different particles.

6. A composite body according to one of claims 1–3, wherein the holding fibers taken from tbe cover layer, are penetrating the backing layer at locations free of depressions.

7. A composite body according to claim 6, wherein the depth of penetration of the holding fibers in the depressions is smaller than the height of said depressions.

8. A composite body according to claim 6, wherein the holding fibers are penetrating the backing layer in the area of the depressions.

9. A composite body according to claim 1 wherein the particles contain inorganic silicate compounds or consist of such compounds.

10. A composite body according to claim 9 wherein the particles comprises rock particles, sand or gravel.

11. A composite body according to claim 1, wherein the particles have a grain size of 0.02–30 mm, preferable 0.02–3 mm.

12. A composite body according to claim 1, wherein the particles are present in the composite body with a weight by unit area of 0.05–12 kg/m².

13. A composite body according to claim 10, wherein further particles are provided in addition to the rock particles.

14. A composite body according to claim 13, wherein the different particles have approximately the same grain size as the rock particles.

15. A composite body according to claim 13, wherein the grain size of the further particles is substantially smaller than that of the rock particles.

16. A composite body according to claims 13 or 15, wherein the further particles are attached to the rock particles by adhesive bonding.

17. A composite body according to claims 13 or 15 wherein the rock particles are completely encapsulated by the particles.

* * * * *